United States Patent
Da et al.

(10) Patent No.: US 11,727,301 B2
(45) Date of Patent: Aug. 15, 2023

(54) EXPLOITING LOCAL INTER-TASK RELATIONSHIPS IN ADAPTIVE MULTI-TASK LEARNING

(71) Applicant: SAP SE, Walldorf (DE)

(72) Inventors: Bingshui Da, Singapore (SG); Chen Wang, Singapore (SG); Yew Soon Ong, Singapore (SG); Abhishek Gupta, Singapore (SG)

(73) Assignee: SAP SE, Walldorf (DE)

(*) Notice: Subject to any disclaimer, the term of this patent is extended or adjusted under 35 U.S.C. 154(b) by 1701 days.

(21) Appl. No.: 15/656,059

(22) Filed: Jul. 21, 2017

(65) Prior Publication Data

US 2019/0026648 A1   Jan. 24, 2019

(51) Int. Cl.
   *G06N 20/00*      (2019.01)
   *G06F 7/14*       (2006.01)
   *G06F 16/28*      (2019.01)
   *G06N 7/01*       (2023.01)

(52) U.S. Cl.
   CPC .............. *G06N 20/00* (2019.01); *G06F 7/14* (2013.01); *G06F 16/285* (2019.01); *G06N 7/01* (2023.01)

(58) Field of Classification Search
   None
   See application file for complete search history.

(56) References Cited

U.S. PATENT DOCUMENTS

| | | | |
|---|---|---|---|
| 9,122,669 B2 | 9/2015 | Demant et al. | |
| 9,576,072 B2 | 2/2017 | Gu et al. | |
| 10,339,177 B2 * | 7/2019 | Tang | G06N 20/00 |
| 2013/0332178 A1 | 12/2013 | Zhong et al. | |

OTHER PUBLICATIONS

Gao, Facial Age Estimation Using Clustered Multi-task Support Vector Regression Machine, 21st International Conference on Pattern Recognition (ICPR 2012), 2012, pp. 541-544 (Year: 2012).*

Zhang, et al., Smart Multitask Bregman Clustering and Multitask Kernel Clustering, ACM Transactions on Knowledge Discovery from Data, vol. 10, No. 1, Article 8, 2015, pp. 8:1-8:29 (Year: 2015).*

Frohlich, B. et al., "Large-scale gaussian process multi-class classification for semantic segmentation and facade recognition," Machine Vision and Applications vol. 24, pp. 1043-1053. (Year: 2013).*

* cited by examiner

*Primary Examiner* — Brian M Smith
(74) *Attorney, Agent, or Firm* — Fish & Richardson P.C.

(57) ABSTRACT

Methods, systems, and computer-readable storage media for receiving a dataset, the dataset including a plurality of data values, clustering data values of the plurality of data values into a plurality of input feature clusters in input feature space, training a local multi-task Gaussian process (MTGP) for each input feature cluster to provide optimized hyper-parameters in hyper-parameter space, an optimized hyper-parameter being provided for each input feature cluster, merging data values based on the optimized hyper-parameters, and distances between hyper-parameter clusters in the hyper-parameter space to provide a plurality of merged data values, and providing a LL-MTGP model based on the merged data values.

20 Claims, 6 Drawing Sheets

EXPLOITING LOCAL INTER-TASK RELATIONSHIPS IN ADAPTIVE MULTI-TASK LEARNING

BACKGROUND

Multi-task learning (MTL) is a sub-field of machine-learning. In MTL, a set of tasks are learned simultaneously using a shared representation, with the objective that domain knowledge contained in the training signals of related tasks can often lead to improved generalization performance. In the classification context, MTL aims to improve the performance of multiple classification tasks by learning them jointly. Example applications of MTL include personalized spam-filters (e.g., to classify electronic messages), and personalized web search (e.g., to classify electronic documents (web pages)).

In recent advances towards adaptive MTL, in which information is adaptively shared, a common approach is to only exploit global relationships between tasks, typically neglecting local task similarities. Consequently, existing MTL approaches may be considered too restrictive to harness the full potential of MTL. For example, while a pair of tasks may appear unrelated in the global sense, there may exist some local regions (i.e., subspaces) wherein the two tasks are indeed highly correlated.

SUMMARY

Implementations of the present disclosure include computer-implemented methods for adaptive multi-task learning (MTL). In some implementations, actions include receiving a dataset, the dataset including a plurality of data values, clustering data values of the plurality of data values into a plurality of input feature clusters in input feature space, training a local multi-task Gaussian process (MTGP) for each input feature cluster to provide optimized hyper-parameters in hyper-parameter space, an optimized hyper-parameter being provided for each input feature cluster, merging data values based on the optimized hyper-parameters, and distances between hyper-parameter clusters in the hyper-parameter space to provide a plurality of merged data values, and providing a LL-MTGP model based on the merged data values. Other implementations of this aspect include corresponding systems, apparatus, and computer programs, configured to perform the actions of the methods, encoded on computer storage devices.

These and other implementations can each optionally include one or more of the following features: the clustering is performed using k-means clustering; merging includes: merging clusters having a minimum distance in the hyper-parameter space to provide a merged cluster, re-optimizing hyper-parameters of the local MTGP of the merged cluster, and recalculating distances between clusters in the hyper-parameter space; merging is iteratively performed until the minimum distance is greater than a threshold distance; each distance is determined as an averaged absolute distance between means of locally-learned inter-task similarities; the plurality of merged data values are representative of local inter-task relationships in the adaptive MTL; and actions further include providing the LL-MTGP model to an information retrieval system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to adaptive multi-task learning (MTL). More particularly, implementations of the present disclosure are directed to exploiting local inter-task relationships in adaptive MTL. Implementations can include actions of receiving a dataset, the dataset including a plurality of data values, clustering data values of the plurality of data values into a plurality of input feature clusters in input feature space, training a local multi-task Gaussian process (MTGP) for each input feature cluster to provide optimized hyper-parameters in hyper-parameter space, an optimized hyper-parameter being provided for each input feature cluster, merging data values based on the optimized hyper-parameters, and distances between hyper-parameter clusters in the hyper-parameter space to provide a plurality of merged data values, and providing a LL-MTGP model based on the merged data values.

Figure 1:
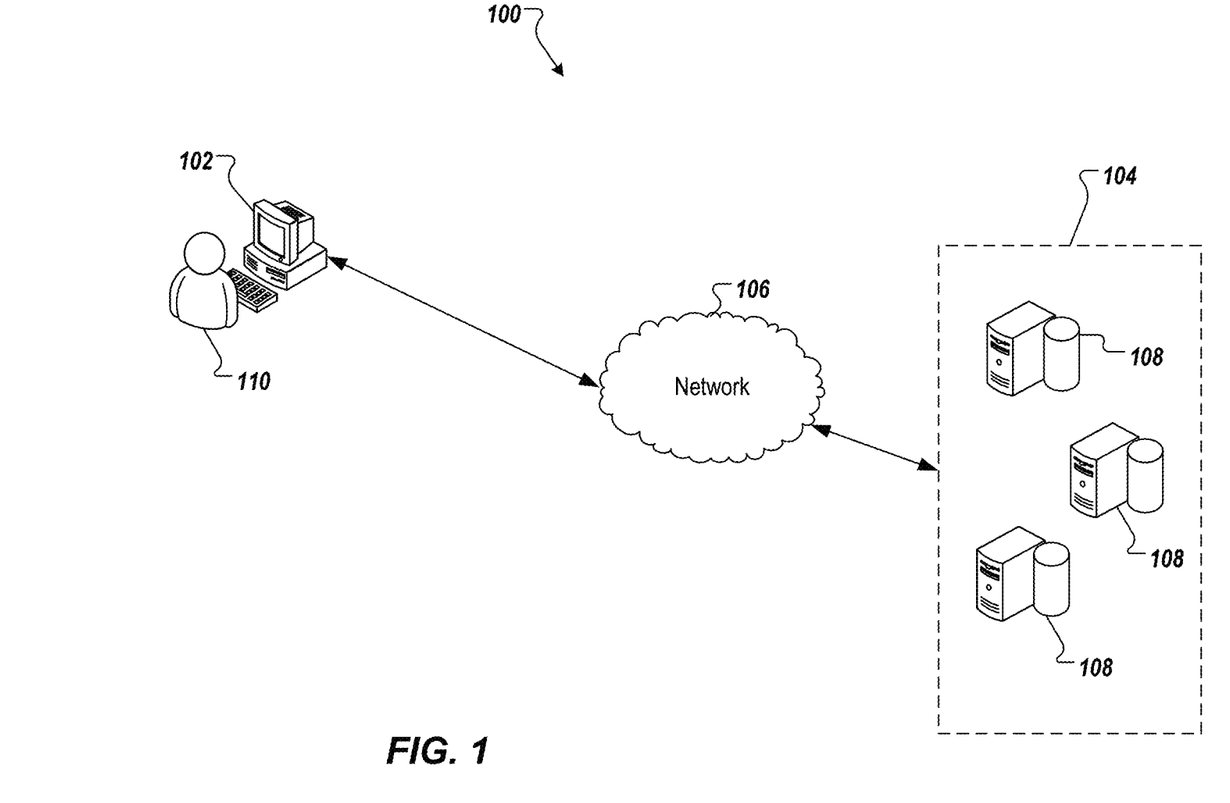
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host an adaptive MTL service (e.g., provided as one or more computer-executable programs executed by one or more computing devices). For example, input data (training data) can be provided to the server system (e.g., from the client device 102), and the server system can process the input data through the adaptive MTL service to provide result data. For example, the server system 104 can send the result data to the client device 102 over the network 106 for display to the user 110.

As introduced above, existing approaches to adaptive MTL only exploit global relationships between tasks, typically neglecting local task similarities. Consequently, existing approaches may be considered too restrictive to harness the full potential of adaptive MTL. For example, while a pair of tasks may appear unrelated in the global sense, there may exist some local regions (i.e., subspaces) wherein the two tasks are indeed highly correlated.

In view of the above context, and as described in further detail herein, implementations of the present disclosure are directed to exploiting local inter-task relationships in adaptive MTL. In the present disclosure, adaptive MTL learning is cast in an empirical Bayes setting, and implementations of the present disclosure are based on a multi-task Gaussian Process model. Experiments on synthetic and real-world datasets showcase the benefits of implementations of the present disclosure as compared to existing approaches.

To provide further context for implementations of the present disclosure, MTL is an active research arena, which aims to improve generalization performance by learning multiple, possibly related tasks together using a shared representation. The motivation behind the paradigm lies primarily in the intuition that domain-specific information contained in the training signals of related tasks lends a useful inductive bias during the learning process, which otherwise remains untapped when tasks are learned in isolation in a tabula rasa (blank slate) manner. Over the years, a naive approach in MTL has been to rely on the practitioner to possess some a priori understanding of the suitability of its application in a given scenario. In other words, had been commonly assumed that all tasks to be learned together are indeed related and suitable for joint training. However, on occasions when this assumption does not hold, the inductive transfer between tasks can end up hurting. This deleterious phenomenon is commonly referred to as negative transfer, and generally leads to worsened generalization performance. The above-described observation has laid the foundation for recent works in adaptive MTL, where models are equipped to continue benefiting from the positive relationships between tasks (i.e., by transferring shared knowledge as much as possible when the tasks are related), while automatically identifying and minimizing negative transfer when the tasks are unrelated.

Several noteworthy works on adaptive MTL are based on the underlying contention that the relationship between a pair of tasks can be captured through a single scalar parameter. In other words, it is assumed that the inter-task similarities are uniform across all subspaces of the input feature space. For instance, in one approach, the relationships between M tasks learned concurrently was expressed in the form of a general M×M positive semi-definite (PSD) matrix representing the inter-task similarities in multi-task Gaussian Process (GP) predictions. A similar approach for adaptive transfer learning was also proposed, in which a single (hyper)parameter is introduced to encapsulate the relationship between data points in the source and target domains. In another approach, a convex regularization formulation for learning the relationships between tasks is provided, in which a key condition is that the similarity between any pair of tasks is expressed by a single number.

The present disclosure views such existing approaches as too restrictive for general cases of multi-task learning where inter-task relationships can indeed be non-uniform across the input feature space. In order to account for such scenarios, it is necessary to have at least a set of inter-task similarities for appropriately describing the relationship between a pair of tasks. Each element of such a set would represent the local inter-task similarity in a particular subspace within the extent of the input feature space.

Figure 2:
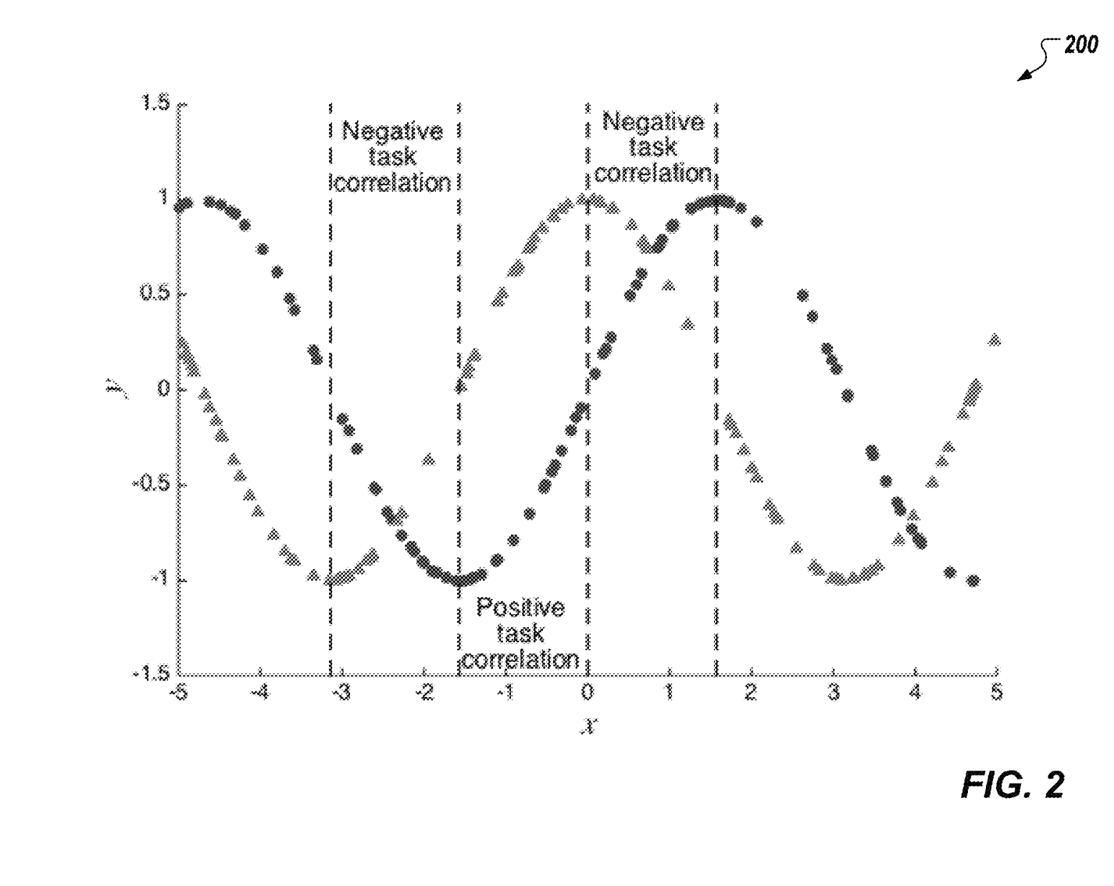
FIG. 2 depicts an example graph of randomly sampled data points to provide example context for implementations of the present disclosure.

FIG. 2 depicts an example graph 200 of randomly sampled data points to provide example context for implementations of the present disclosure. The example graph 200 of FIG. 2 provides an illustrative example including randomly sampled data points from a pair of differentially phase shifted sinusoidal functions (e.g., where the difference in phase shift is $\pi/2$). The two functions are to be learned together. Visually, it is evident that there exist alternating regions of positive and negative correlation between the tasks. It can be noted that negative correlation does not imply negative transfer, as the knowledge of negative correlations may be exploited for improved learning. While a model capable of inferring local relationships can be equipped to exploit such latent properties of datasets, it is contended that the global view of existing adaptive MTL approaches may cause them to miss out on the intricacies. For the purpose of demonstration, a state-of-the-art MTL method can be applied to this dataset. After training the model, it is revealed that the learned inter-task similarity is approximately 0, which implies that the tasks are nearly unrelated. In other words, the potential for exploiting the hidden relationship between them is completely lost. However, it is apparent from FIG. 2, that such a conclusion is not entirely accurate, as there is known to be an underlying correspondence between the two functions.

The example illustration of FIG. 2 highlights the motivation of the present disclosure towards exploiting local inter-task relationships in adaptive MTL. The present disclosure casts the problem of efficiently learning local similarities between tasks in an empirical Bayes setting, and, to this end, provides an enhancement to the MTL GP model. The approach detailed here is referred to as the Local Learning Multi-Task Gaussian Process (LL-MTGP). The present disclosure provides a detailed exposition on the learning algorithm and empirical test of the LL-MTGP, beginning with a brief review of traditional single-task and multi-task GP regression, then describes the present disclosure's strategy for exploiting local inter-task similarities, and provides an experimental study, including a one-dimensional (1-D) toy problem that provides visual insights into the efficacy of implementations of the present disclosure. Further, extensive experiments on real-world datasets and their results are described to highlight the benefits of the LL-MTGP as compared with existing approaches.

Traditional single-task GP (STGP), and its generalization to the case of MTL, are described. With reference to GP regression, for a single-task learning problem, a dataset X with N training inputs and a corresponding output vector y where $y_n$ is the observed output for input $x_n$ are provided. It is generally considered that $y_n = f(x_n) + \in$, where the noise $\in$ is assumed to be an independent, identically distributed (i.i.d.) Gaussian distribution with zero mean and variance $\sigma_n^2$, (i.e., $\in \sim \mathcal{N}(0, \sigma_n^2)$). Learning $f$ is performed, conditioned on the training data X, y.

GP is a popular stochastic non-parametric approach for regression. It describes a distribution over functions, given as:

$$f \sim GP(m, k) \qquad (1)$$

where m is the mean (typically m=0), and k is a covariance function. The GP predictive distribution at a new data point x* is given by:

$$p(f_*|X, y, x_*) = N(\mu(x_*), \sigma^2(x_*)) \qquad (2)$$

$$\mu(x_*) = k_*^T (K + \sigma^2 I)^{-1} y \qquad (3)$$

$$\sigma^2(x_*) = k_{**} - k_*^T (K + \sigma^2 I)^{-1} k_* \qquad (4)$$

where K is the kernel matrix with $K_{ij} = k(x_i, x_j)$, $k_* = K(X, x_*)$, and $k_{**} = k(x_*, x_*)$. With regard to the kernel function, the following squared exponential covariance function with Automatic Relevance Determination (ARD) can be used:

$$k(x, x') = \sigma_S^2 \exp\left(-\frac{1}{2}(x - x')^T \Lambda^{-1}(x - x')\right) \qquad (5)$$

where $\sigma_s^2$ denotes the variance of the latent function $f$ and $\Lambda$ is a diagonal matrix consisting of the characteristic length-scales of the squared exponential kernel.

In some examples, multi-task GP (MTGP) is a Bayesian adaptive multi-task learning approach that leverages the complementary relationship between tasks, while automatically combating the threat of negative transfer, by learning a matrix $K^f$ that captures inter-task similarities. Given a dataset X of N input points, as described previously, the model attempts to learn M tasks, given by output observations $y = (y_{11}, \ldots, y_{N1}, y_{12}, \ldots, y_{N2}, y_{1M}, \ldots, y_{NM})^T$, jointly. Here, $y_{nl}$ is the response for the $l^{th}$ task on the $n^{th}$ input $x_n$.

According to the formulation of a standard GP model, the following expression is adopted for the observed output of the $l^{th}$ task:

$$y_{nl} = f_l(x_n) + \in_l, \text{ with } \in_l \sim \mathcal{N}(0, \sigma_l^2) \qquad (6)$$

where $\sigma_l^2$ is the noise variance for the $l^{th}$ task. Further, the covariance between points belonging to either the same or different tasks can be stated as:

$$\langle f_l(x), f_k(x') \rangle = K_{lk}^f k^x(x, x') \qquad (7)$$

where $K_{lk}^f$ is the inter-task similarity between the $l^{th}$ and the $k^{th}$ tasks, and $k^x$ is the correlation function between inputs x and $x^0$. The joint distribution of the observed outputs of the training data and the predicted function values (corresponding to all tasks) at a new data point $x_*$ can be written under the Gaussian prior as:

$$\begin{bmatrix} y \\ f_* \end{bmatrix} \sim \mathcal{N}\left(0, \begin{bmatrix} K^f \otimes K^x + D \otimes I & K^f \otimes k_*^x \\ (K^f \otimes k_*^x)^T & K^f \otimes k_{**}^x \end{bmatrix}\right) \qquad (8)$$

where $\otimes$ is the Kronecker product, $K^x = k^x(X, X)$ is the covariance matrix between all pairs of training points, $k_*^x$ is the vector of correlations between the test point and the training points, $k_{**}^x$ is the variance (constrained to unity) of the test point itself, D is an M×M diagonal matrix in which the $(l,l)^{th}$ element is $\sigma_l^2$, and I is an N×N identity matrix. As a consequence, the conditional distribution yields the predicted mean value on a new data point $x_*$ for task l as:

$$\bar{f}_l(x_*) = (k_l^f \otimes k_*^x)^T (K_f \otimes K^x + D \otimes I)^{-1} y \qquad (9)$$

where $k_l^f$ is the $l^{th}$ column of $K^f$.

During hyper-parameter optimization, the kernel parameters $\theta_x$ of $k^x$, the matrix $K^f$ and the noise variance of each task are learned in an empirical Bayes setting, by maximizing the log marginal likelihood. This can be achieved by standard gradient descent or using an EM algorithm exploiting the Kroneker factorization.

As introduced above, implementations of the present disclosure are directed to the LL-MTGP model for exploiting local inter-task relationships. In some implementations, unsupervised clustering is performed on all of the training data based on the input features, the training data being clustered into several (m) subsets, denoted as $C_1$, $C_2$, ..., $C_m$. The only requirement is to have sufficient representative points corresponding to each task in each cluster. In some implementations, the standard k-means clustering algorithm suffices for a large number of well distributed data points. After clustering, the following example covariance function can be performed for points located in either the same or different clusters:

$$\langle f_l(x), f_k(x') \rangle = K_{lk}^f \delta_{c(x), c(x')} k^x(x, x') = K_{lk}^f k_\delta^x(x, x') \qquad (10)$$

where $\delta_{ij}$ is the Kronecker delta function, and c(.) is the function that maps an input point to one of the clusters. The proposed model implies that the covariance when points x and $x^0$ belong to the same cluster (i.e., $c(x) = c(x^0)$) is equivalent to the case of standard MTGP, while it is 0 otherwise (i.e., the points are assumed unrelated). In other words, each cluster is viewed as contributing toward a separate local MTGP model.

It can be noted that such a compactly supported covariance function may result in a less accurate oversimplified global model. In order to achieve a favorable trade-off between oversimplified local MTGPs and the power of full non-parametric modelling, the merging of data points in complementing clusters is performed for learning more globally-supported covariance functions that can provide enhanced accuracy.

In order to establish a qualitative notion of complementarity between clusters in the input feature space, the case of m=2 disjoint spatially localized data subsets can be considered, which are used to train two local MTGPs. The following example proposition can be set forth:

Proposition 1. If two local MTGPs corresponding to geometrically distant clusters $C_1$ and $C_2$ have an identical set of optimized hyper-parameters, then the same hyper-parameters are also locally optimum for an MTGP built on the merged cluster $C=C_1 \cup C_2$.

The following example proof can be provided:

Proof. Let $(X_1, y_1)$, $(X_2, y_2)$, and $(X, y)$ denote the data in $C_1$, $C_2$, and the merged cluster C, respectively. The log marginal likelihood expressed for C takes the form:

$$\log p(y|X) = \qquad (11)$$
$$-\frac{1}{2}y^T(K^f \otimes K^x + D \otimes I)^{-1}y - \frac{1}{2}\log|K^f \otimes K^x + D \otimes I| + \alpha$$

where $\alpha$ is a constant. Under the condition that $k^x(x, x') \simeq 0$ for geometrically distant points in the input feature space, Equation (11) reduces to the following:

$$\log p(y|X) \simeq \frac{1}{2}[y_1^T, y_2^T]\begin{bmatrix} \Psi_1 & 0 \\ 0 & \Psi_2 \end{bmatrix}^{-1}\begin{bmatrix} y_1 \\ y_2 \end{bmatrix} - \frac{1}{2}\log\left|\begin{bmatrix} \Psi_1 & 0 \\ 0 & \Psi_2 \end{bmatrix}\right| + \alpha = \qquad (12)$$
$$\log p(y_1|X_1) + \log p(y_2|X_2)$$

where $\Psi_1 = K^f \otimes K^{x_1} + D_1 \otimes I$, and $\Psi_2 = K^f \otimes K^{x_2} + D_2 \otimes I$. $D_1$ and $D_2$ are diagonal matrices denoting the noise terms in clusters $C_1$ and $C_2$, respectively.

Based on Proposition 1, the problem of merging data points within complementing clusters may be transformed to that of subsequent clustering in hyper-parameter space (with the higher-order clusters being denoted as $hC_1, hC_2, \ldots$).

Figure 3:
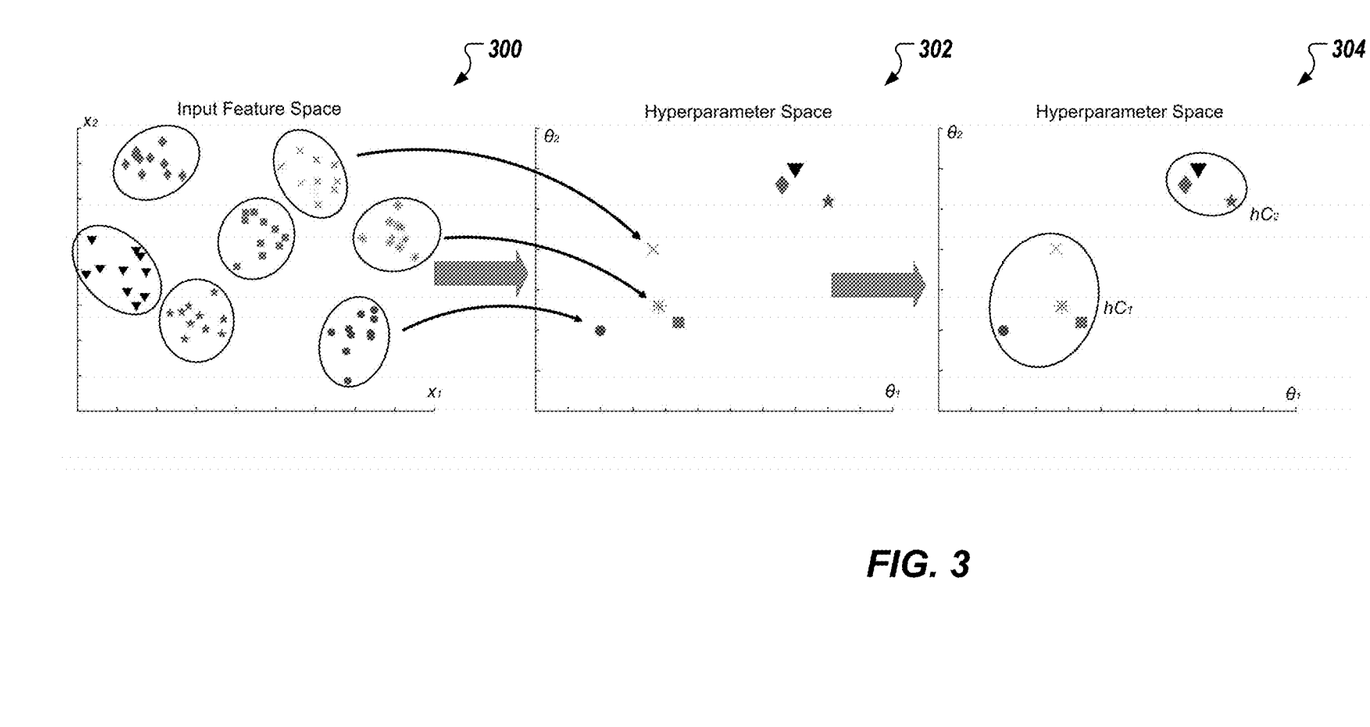
FIG. 3 depicts an example progression from input feature space to clusters in hyper-parameter space in accordance with implementations of the present disclosure.

This idea is illustrated in FIG. 3, which depicts an example progression from clusters in input feature space 300 to hyper-parameters in hyper-parameter space 302 to clusters in hyper-parameter space 304 in accordance with implementations of the present disclosure. In the example of FIG. 3, each cluster in the input feature space corresponds to a unique point representing the hyper-parameters of the associated local MTGP model. Thereafter, the statement of Proposition 1 provides the necessary intuition for consolidating local MTGP models having similar hyper-parameter values. Thus, their respective data points are merged to facilitate the construction of new, more globally-supported MTGPs. The progressive merging of clusters continues until the minimum distance between points in the hyper-parameter space becomes greater than a user-defined threshold $\lambda$. In some implementations, this distance is measured by the averaged absolute difference in the means of locally learned inter-task similarities. To elaborate, the strategy for measuring distances facilitates subspaces, in which tasks are similarly correlated, to be progressively consolidated. An overview of the steps involved in the approach of the present disclosure are presented in the pseudocode of the following example algorithm:

---
Algorithm 1: Data Merging
---
Data: X, y, m, $\lambda$
Cluster X into m subsets;
Train local MTGP on every cluster to find optimized hyper-parameters;
Calculate distances between clusters in hyper-parameter space;
while min{ distances } < $\lambda$ do
   Merge clusters with smallest distance in hyper-parameter space;
   Initialize hyper-parameters of merged cluster as either one of two parent clusters;
   Re-optimize hyper-parameters of local MTGP corresponding to merged cluster;
   Recalculate distances between updated clusters in hyper-parameter space;
end
---

Due to the iterative nature of the above-provided training algorithm for the LL-MTGP, there may be concerns regarding its computational complexity. To this end, the computational practicality of the approach described herein is highlighted based on the following result:

Proposition 2. Given a large number m of uniform initial subsets (while ensuring m≪N), the minimum number of iterations of merging clusters available for the complexity of LL-MTGP to match that of standard MTGP can be approximated by $\sqrt{2} \, m^{3/4}$.

Proof. The complexity of the standard MTGP is $\mathcal{O}(M^3N^3)$. Assuming each initial cluster to have N/m points, and ignoring the complexity of the clustering algorithm (since m≪N), the complexity of the first local training step is given by $\mathcal{O}(m \times M^3N^3/m^3)$. Further, over the next k−1 steps, the maximum total complexity can be approximated as:

$$\mathcal{O}\left(\frac{M^3N^3}{m^3}(m + 2^3 + 3^3 + \cdots + k^3)\right) \qquad (13)$$

Accordingly, for the complexity of LL-MTGP to be less than that of MTGP, the following inequality must hold:

$$\frac{M^3N^3}{m^3}(m + 2^3 + 3^3 + \cdots + k^3) \leq M^3N^3 \qquad (14)$$

Given the known result $\Sigma_{i=1}^{k} i^3 = k^2(k+1)^2/4$, and in the limit of sufficiently large values of m, Equation 14 reduces to $k(k+1) < 2 \, m^{3/2}$, which on further simplification provides the result of the theorem.

In accordance with implementations of the present disclosure, the LL-MTGP can be used for predictions. For predictions at a new data point the mean of the conditional distribution for the $l^{th}$ task is based on the covariance function in Equation 10, and is given by:

$$\bar{f}_l(x_*) = (k_l^f \otimes k_{\delta *}^x)^T \Sigma^{-1} y \qquad (15)$$

where $k_{\delta *}^x = \delta_{c(x_*),c(X)} \circ k_*^x$ (where $\circ$ is the Schur product), and $\Sigma$ is the full covariance matrix learned by the LL-MTGP. For specifying $k_{\delta *}^x$, the new data point is first assigned to one among the final set of clusters learned by the LL-MTGP at the end of Algorithm 1. In accordance with implementations of the present disclosure, the cluster assignment is realized through single-linkage strategy based on Euclidean distances in the input feature space.

Figure 4:
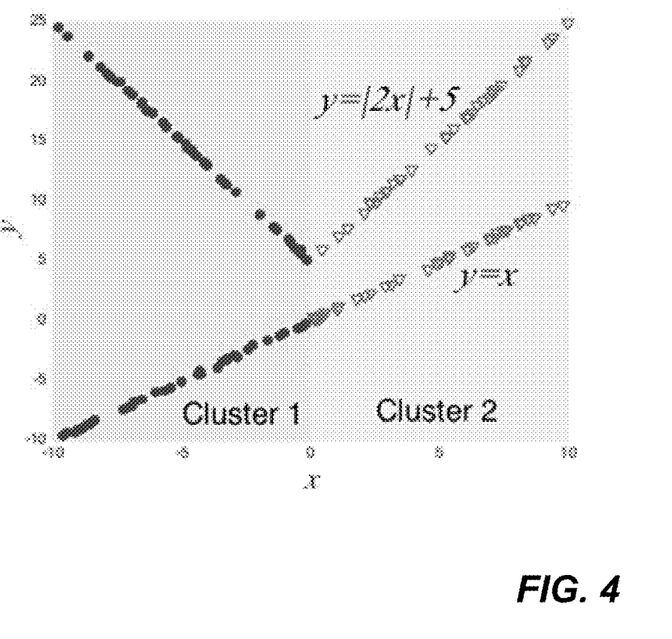
FIG. 4 depicts example synthetic data used in experiments on implementations of the present disclosure.

Experimental studies were performed to highlight the efficacy of implementations of the present disclosure. The experimental studies included both a synthetic dataset, and a real-world dataset. With regard to the synthetic dataset, a toy dataset is considered, which provides insight and verification of the behavior of the LL-MTGP. The test data generation is carried out as follows. One hundred (100) data points are randomly sampled from each of the two 1-D functions y=x and y=|2x|+5, corrupted by a zero-mean Gaussian noise with variance equal to 0.1. From the 200 points in total, 150 samples are randomly sampled for training, and the remaining 50 samples are used for testing. The training data is depicted in FIG. 4. After training the standard MTGP, the following (normalized) inter-task similarity matrix is provided:

$$K^f = \begin{bmatrix} 1.0000 & 0.0330 \\ 0.0330 & 1.0000 \end{bmatrix} \quad (16)$$

The off-diagonal terms of Vindicate that the two tasks are practically unrelated (in a global sense). However, it is visually apparent from FIG. 4 that there naturally exist a pair of clusters in the input feature space such that the inter-task similarity approaches +1 when x>0 and −1 when x<0. In the LL-MTGP, the initial number of clusters can be set to 10, and λ to 0.2. Equation 17, below, is provided, and shows a sample result of LL-MTGP where the two natural clusters are exactly identified when the stopping condition of Algorithm 1 is satisfied. More particularly, the inter-task similarity within each cluster is learned as:

$$K^f_{C_1} = \begin{bmatrix} 1.0000 & -0.9999 \\ -0.9999 & 1.0000 \end{bmatrix}, K^f_{C_2} = \begin{bmatrix} 1.0000 & 0.9999 \\ 0.9999 & 1.0000 \end{bmatrix} \quad (17)$$

To further demonstrate the efficacy of the LL-MTGP, the average generalization performance on the test set was measured over 10 trial runs. The mean absolute error (MAE), and the associated standard deviation are listed in Table 1, below. From the toy example, it is shown that the exploitation of local inter-task relationships play an important part in enhancing the generalization performance of the multi-task learning approach.

TABLE 1

MAE Comparison - Toy Example

| Method | MAE |
| --- | --- |
| LL-MTGP | 0.0072 ± 0.0005 |
| MTGP | 0.0101 ± 0.0000 |

With regard to the real-world dataset, an example known wine quality dataset is provided, which is related to red and white vinho verde wine samples, and the goal is to model wine quality based on physicochemical tests including Ph values, etc. The labels for the training data are provided by experts with grades between 0 (very bad) and 10 (very good). In the experiment, 1000 samples were randomly selected as the training set and 500 samples as the test set, with results averaged over 10 trial runs. For LL-MTGP, the initial number of clusters was set to 5, and λ to 0.2. The resulting normalized mean square error (NMSE) for each method, and the associated standard deviations are reported in Table 2, which reveals the superiority of LL-MTGP.

TABLE 2

NMSE Comparison for Wine Dataset

| Method | LL-MTGP | MTGP | STGP |
| --- | --- | --- | --- |
| NMSE | 0.0193 | 0.0857 | 0.4490 |
|  | (0.0086) | (0.0458) | (0.3200) |

Another example, known dataset includes an examination score dataset (school dataset), which is used as a benchmark for multi-task regression. The school dataset includes the examination results of 15362 students from 139 secondary schools during the years 1985, 1986 and 1987. The input feature includes the year of the examination, four school-specific attributes and three student-specific attributes. The categorical attributes can be replaced with binary variables so that the total number of features for each student in each school becomes 27. Data from the first four schools is selected, and 10 random splits of the data are used to generate the training and test sets. Accordingly, 75% of the data will belong to the training set and the remaining 25% to the test set. For the experimental setup, the dataset is divided into 5 clusters, and λ for merging clusters is set 0.1 in LL-MTGP. For performance measure, a variance is used to compare LL-MTGP to MTGP and STGP. Note that a larger explained variance indicates superior performance. In Table 3, it is seen that the performance of LL-MTGP of the present disclosure (where 1.3 clusters are learned on average) is better than that of the other approaches.

TABLE 3

Comparison for School Dataset

| Method | LL-MTGP | MTGP | STGP |
| --- | --- | --- | --- |
| Explained Variance | 77.16 | 51.45 | 70.75 |
|  | (2.85) | (8.49) | (5.58) |

Another example, known dataset includes the so-called SARCOS dataset, which relates to an inverse dynamics problem for a seven degrees-of-freedom anthropomorphic robot arm. The task is to map from a 21-dimensional input space (7 joint position, 7 joint velocities, 7 joint accelerations) to the corresponding 7 joint torques. Therefore, the input has 21 dimensions, and there are 7 tasks for each input. A random selection of 500 samples is taken for the training set, and 500 samples for testing. 10 trial runs are performed over random splits. In LL-MTGP, the number of initial clusters is set to 5 and the threshold λ is 0.3. The averaged NMSE, and the associated standard deviation are summarized in Table 4. The results reveal that the performance of LL-MTGP (where 3.6 clusters are learned on average) is notably better than that of the MTGP and STGP on the first three tasks, while it is slightly better than MTGP on the sixth task.

TABLE 4

Comparison for SACROS Dataset

| Method | 1st DOF | 2nd DOF | 3rd DOF | 4th DOF | 5th DOF | 6th DOF | 7th DOF |
|---|---|---|---|---|---|---|---|
| LL-MTGP | 0.6476 (0.2896) | 0.1325 (0.0613) | 0.0800 (0.0654) | 0.0197 (0.0401) | 0.2108 (0.2566) | 0.7224 (0.9331) | 0.0331 (0.0470) |
| MTGP | 1.1478 (0.1456) | 0.2129 (0.0733) | 0.1551 (0.0356) | 0.0142 (0.0121) | 0.0446 (0.0147) | 0.7227 (1.3976) | 0.0159 (0.0041) |
| STGP | 0.75702 0.21051 | 0.38009 (0.34164) | 0.37706 (0.35534) | 0.5344 (0.46131) | 0.37878 (0.30219) | 0.37471 (0.29155) | 0.1831 (0.28691) |

Figure 5:
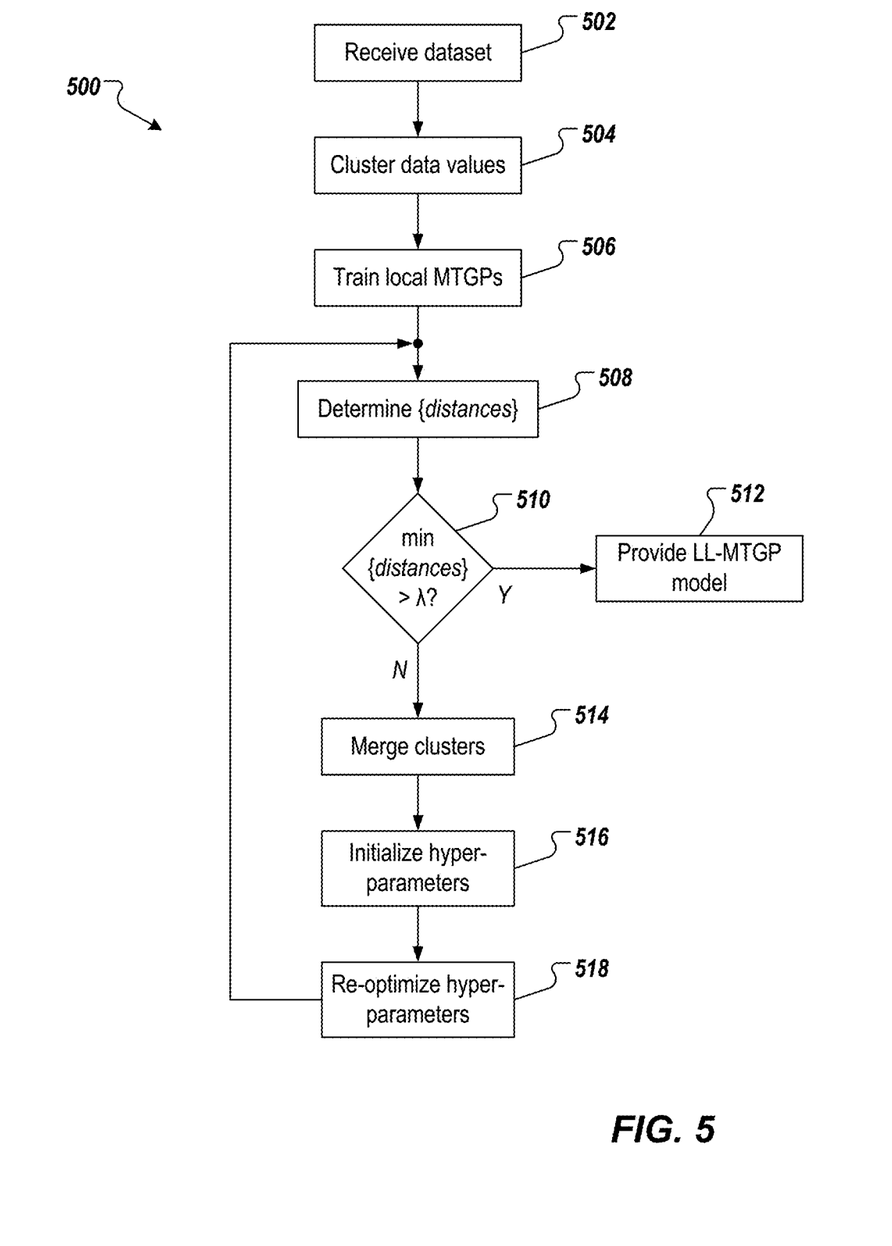
FIG. 5 depicts an example process that can be executed in accordance with implementations of the present disclosure.

FIG. 5 depicts an example process 500 that can be executed in accordance with implementations of the present disclosure. In some examples, the example process 500 can be provided by one or more computer-executable programs executed using one or more computing devices. In some examples, the example process 500 is executed for adaptive MTL in accordance with implementations of the present disclosure.

A dataset is received (502). For example, a dataset X is received and include N training inputs $x_1, \ldots, x_N$. Data values of the plurality of data values are clustered (504). For example, the data values are clustered into a plurality of input feature clusters (e.g., $C_1, C_2, \ldots$) in input feature space (e.g., see FIG. 3). In some examples, clustering is performed using k-means clustering. A local MTGP is trained for each input feature cluster (506). For example, each local MTGP is trained to provide optimized hyper-parameters in hyper-parameter space. In some examples, an optimized hyper-parameter being provided for each input feature cluster (e.g., see FIG. 3). A set of distances between clusters is determined (508). In some examples, each distance is determined as each distance is determined as an averaged absolute distance between means of locally-learned inter-task similarities.

It is determined whether a minimum distance in the set of distances is less than a threshold distance ($\lambda$) (510). If the minimum distance in the set of distances is greater than the threshold distance, a LL-MTGP is provided based on merged data values (512). In some examples, and as described herein, the LL-MTGP model can be used to make predictions based on new data points. If the minimum distance in the set of distances is not greater than the threshold distance, data values of the clusters associated with the minimum distance (e.g., the two clusters between which the minimum distance is provided) are merged (514). Hyper-parameters of merged data values (merged clusters) are initialized (e.g., as those of one of the parent clusters) (516). Hyper-parameters of a local MGTP corresponding to the merged cluster are re-optimized (518), and the example process 500 loops back.

Figure 6:
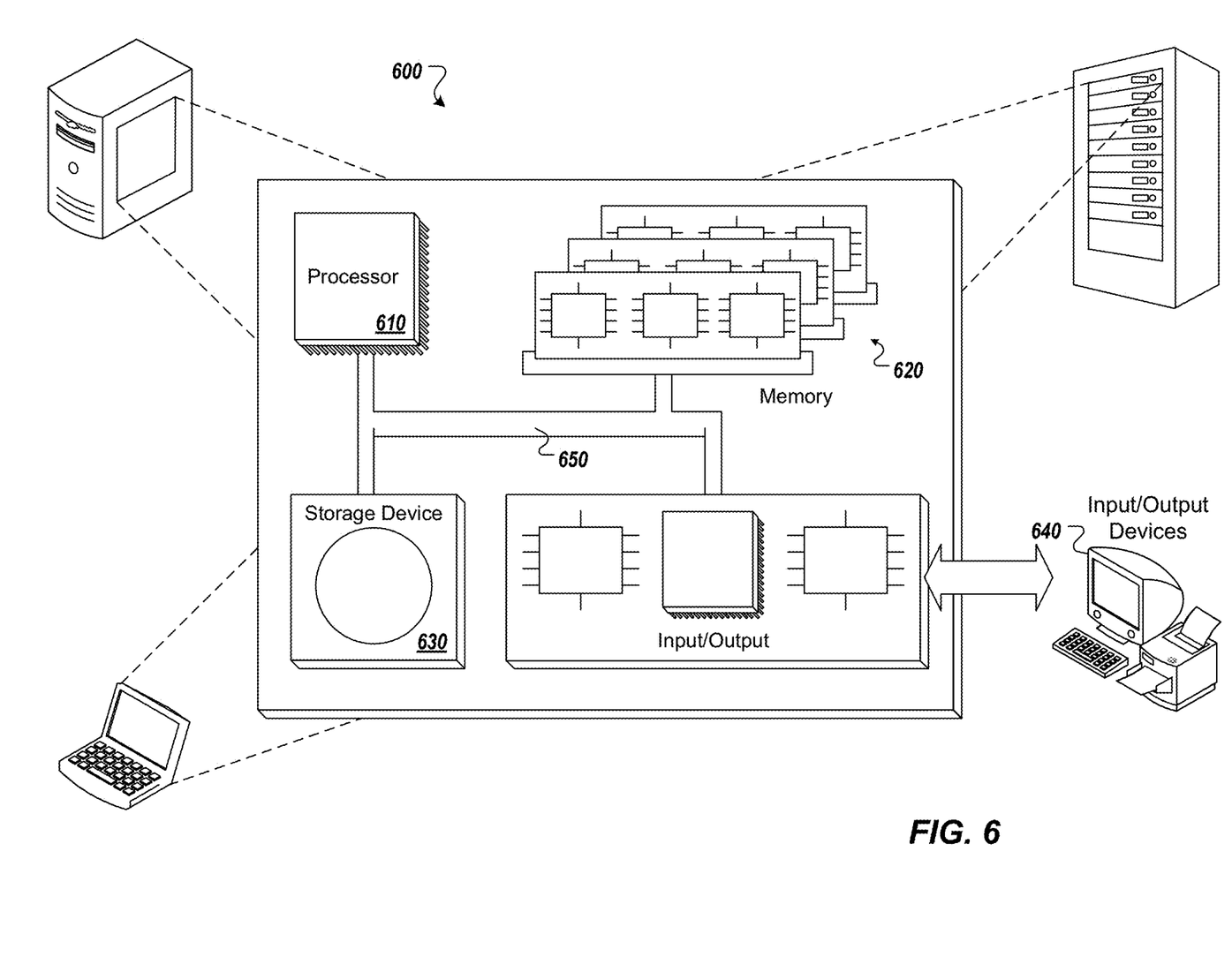
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for adaptive multi-task learning (MTL), the method being executed by one or more processors and comprising:
   receiving, by the one or more processors, a dataset, the dataset comprising a plurality of data values;
   clustering, by the one or more processors, data values of the plurality of data values into a plurality of input feature clusters in input feature space;
   training, by the one or more processors, a local multi-task Gaussian process (MTGP) for each input feature cluster to provide a set of local MTGPs, each local MTGP in the set of local MTGPs being associated with a respective input feature cluster and having optimized hyper-parameters in hyper-parameter space, an optimized hyper parameter being provided for each input feature cluster;
   iteratively training a local learning MTGP (LL-MTGP) by:
      merging hyper-parameters of two or more local MTGPs to provide a merged cluster representative of merged data values based on the optimized hyper-parameters,
      initializing hyper-parameters of a local MTGP of the merged cluster as the hyper-parameters of one of the two or more local MTGPs, and
      optimizing the hyper-parameters of the local MTGP of the merged cluster,
      wherein iteratively training selectively ceases based on one or more distances between hyper-parameter clusters of the set of hyper-parameter clusters in the hyper-parameter space; and
   providing, by the one or more processors, the LL-MTGP model to generate predictions.

2. The method of claim 1, wherein the clustering is performed using k-means clustering.

3. The method of claim 1, wherein merging comprises:
   merging clusters having a minimum distance in the hyper-parameter space to provide the merged cluster.

4. The method of claim 3, wherein iteratively training is performed until the minimum distance of the one or more distances is greater than a threshold distance.

5. The method of claim 1, wherein each distance is determined as an averaged absolute distance between means of locally-learned inter-task similarities.

6. The method of claim 1, wherein the merged data values are representative of local inter-task relationships in the adaptive MTL.

7. The method of claim 1, further comprising providing the LL-MTGP model to an information retrieval system.

8. A non-transitory computer-readable storage medium coupled to one or more processors and having instructions stored thereon which, when executed by the one or more processors, cause the one or more processors to perform operations for adaptive multi-task learning (MTL), the operations comprising:
   receiving, by the one or more processors, a dataset, the dataset comprising a plurality of data values;
   clustering, by the one or more processors, data values of the plurality of data values into a plurality of input feature clusters in input feature space;
   training, by the one or more processors, a local multi-task Gaussian process (MTGP) for each input feature cluster to provide a set of local MTGPs, each local MTGP in the set of local MTGPs being associated with a respective input feature cluster and having optimized hyper-parameters in hyper-parameter space;
   iteratively training a local learning MTGP (LL-MTGP) by:
      merging hyper-parameters of two or more local MTGPs to provide a merged cluster representative of merged data values based on the optimized hyper-parameters,
      initializing hyper-parameters of a local MTGP of the merged cluster as the hyper-parameters of one of the two or more local MTGPs, and
      optimizing the hyper-parameters of the local MTGP of the merged cluster,
      wherein iteratively training selectively ceases based on one or more distances between hyper-parameter clusters of the set of hyper-parameter clusters in the hyper-parameter space; and
   providing, by the one or more processors, the LL-MTGP model to generate predictions.

9. The computer-readable storage medium of claim 8, wherein the clustering is performed using k-means clustering.

10. The computer-readable storage medium of claim 8, wherein merging comprises:
merging clusters having a minimum distance in the hyper-parameter space to provide the merged cluster.

11. The computer-readable storage medium of claim 10, wherein iteratively training is performed until the minimum distance of the one or more distances is greater than a threshold distance.

12. The computer-readable storage medium of claim 8, wherein each distance is determined as an averaged absolute distance between means of locally-learned inter-task similarities.

13. The computer-readable storage medium of claim 8, wherein the merged data values are representative of local inter-task relationships in the adaptive MTL.

14. The computer-readable storage medium of claim 8, wherein actions further comprise providing the LL-MTGP model to an information retrieval system.

15. A system, comprising:
a computing device; and
a computer-readable storage device coupled to the computing device and having instructions stored thereon which, when executed by the computing device, cause the computing device to perform operations for adaptive multi-task learning (MTL), the operations comprising:
receiving, by the one or more processors, a dataset, the dataset comprising a plurality of data values;
clustering, by the one or more processors, data values of the plurality of data values into a plurality of input feature clusters in input feature space;
training, by the one or more processors, a local multi-task Gaussian process (MTGP) for each input feature cluster to provide a set of local MTGPs, each local MTGP in the set of local MTGPs being associated with a respective input feature cluster and having optimized hyper-parameters in hyper-parameter space;
iteratively training a local learning MTGP (LL-MTGP) by:
merging hyper-parameters of two or more local MTGPs to provide a merged cluster representative of merged data values based on the optimized hyper-parameters,
initializing hyper-parameters of a local MTGP of the merged cluster as the hyper-parameters of one of the two or more local MTGPs, and
optimizing the hyper-parameters of the local MTGP of the merged cluster,
wherein iteratively training selectively ceases based on one or more distances between hyper-parameter clusters of the set of hyper-parameter clusters in the hyper-parameter space; and
providing, by the one or more processors, the LL-MTGP model to generate predictions.

16. The system of claim 15, wherein the clustering is performed using k-means clustering.

17. The system of claim 15, wherein merging comprises:
merging clusters having a minimum distance in the hyper-parameter space to provide the merged cluster.

18. The system of claim 17, wherein iteratively training is performed until the minimum distance of the one or more distances is greater than a threshold distance.

19. The system of claim 15, wherein each distance is determined as an averaged absolute distance between means of locally-learned inter-task similarities.

20. The system of claim 15, wherein the merged data values are representative of local inter-task relationships in the adaptive MTL.

* * * * *